United States Patent [19]

Burrough et al.

[11] 3,724,908
[45] Apr. 3, 1973

[54] FEED MATERIAL HANDLING APPARATUS

[75] Inventors: Donald E. Burrough; David R. Scheffler; Dean E. Seefeld, all of West Bend, Wis.

[73] Assignee: Gehl Company, West Bend, Wis.

[22] Filed: Oct. 22, 1971

[21] Appl. No.: 191,946

[52] U.S. Cl. ..........................302/37, 302/8, 302/38
[51] Int. Cl. .............................................B65g 53/40
[58] Field of Search..............................302/8, 37, 38

[56] References Cited

UNITED STATES PATENTS

| | | | |
|---|---|---|---|
| 2,955,403 | 10/1960 | McKee | 302/37 X |
| 2,127,985 | 8/1938 | Philpott | 302/37 X |
| 3,671,077 | 6/1972 | Hoyt et al. | 302/37 X |
| 3,594,047 | 7/1971 | Pucher | 302/37 |
| 2,482,723 | 9/1949 | Wallace | 302/37 |
| 2,405,094 | 7/1946 | Michael | 302/37 X |

*Primary Examiner*—Evon C. Blunk
*Assistant Examiner*—W. Scott Carson
*Attorney*—James E. Nilles

[57] ABSTRACT

A material handling apparatus for handling silage, for example, and blowing it upwardly into the top of a silo. The apparatus includes a vertically disposed blower having a single rotor which, with the casing of the blower, defines two separate compartments, each of which are fed separately from opposite sides of the blower. The rotor of the blower has paddles for each of the compartments, the paddles for one of the compartments being staggered circumferentially in respect to the paddles in the other compartment. The apparatus also includes novel feeding means for the blower which comprises a pair of whirling horizontal rotors that evenly distribute the material to opposite sides of the blower.

8 Claims, 4 Drawing Figures

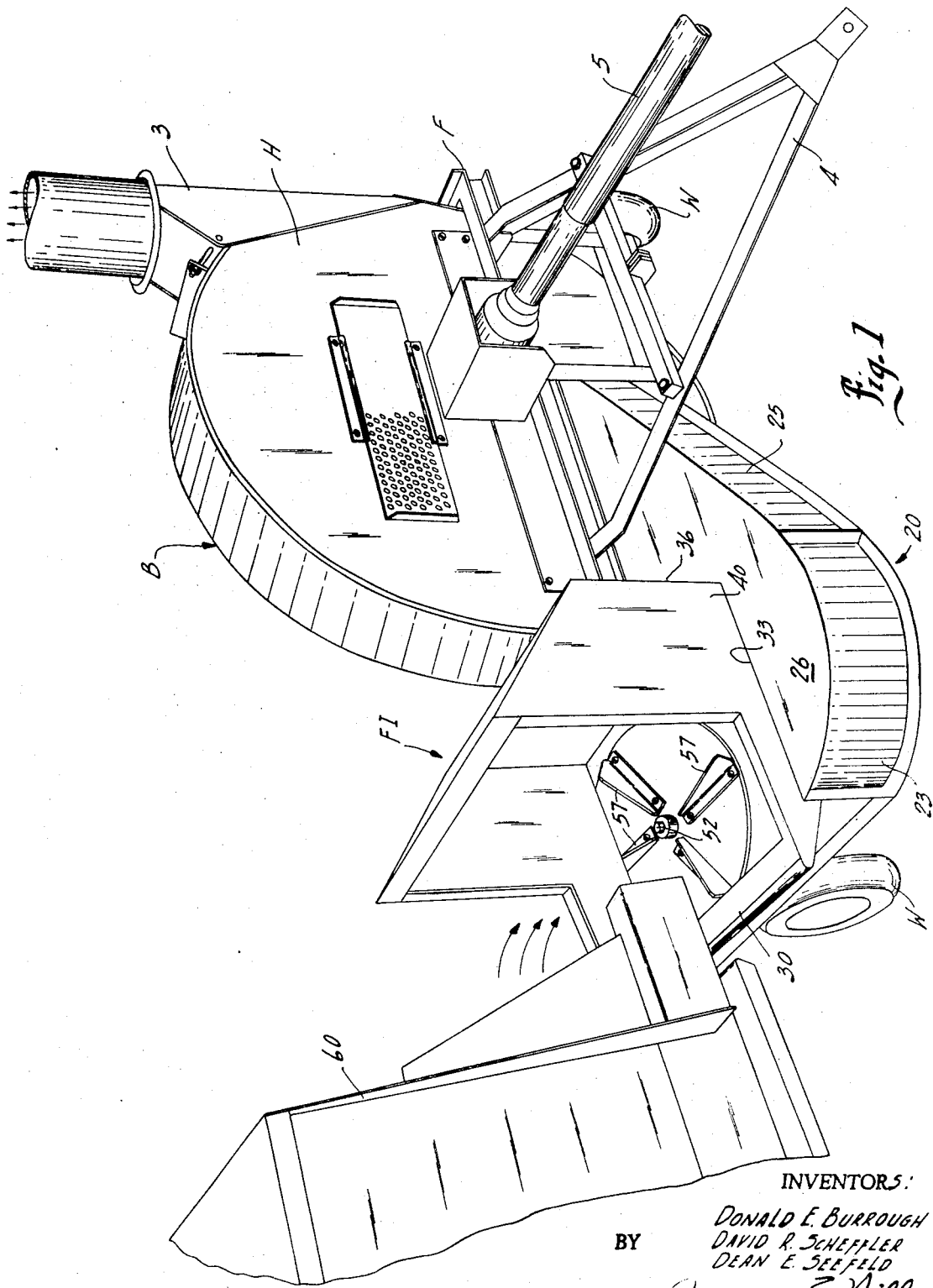

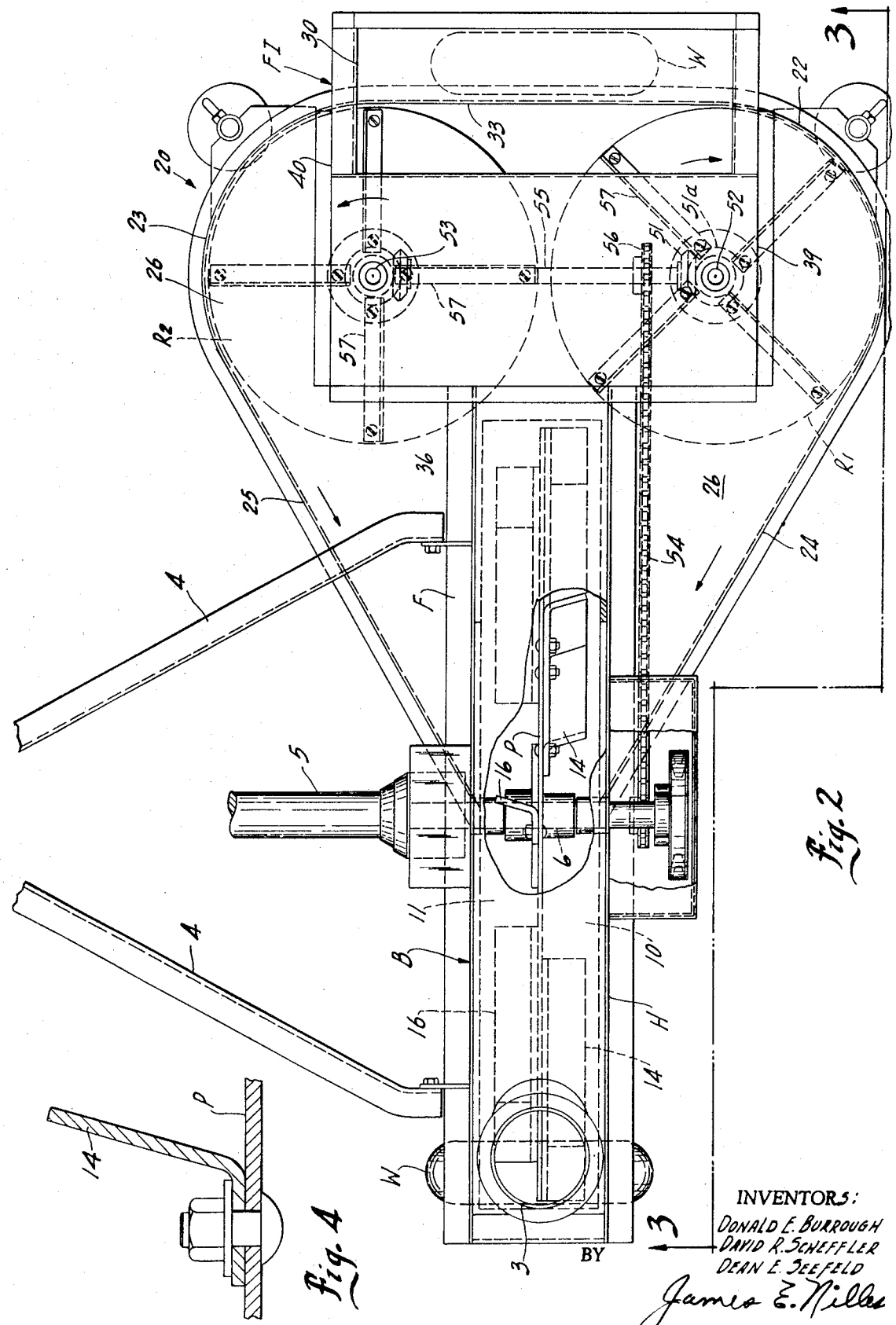

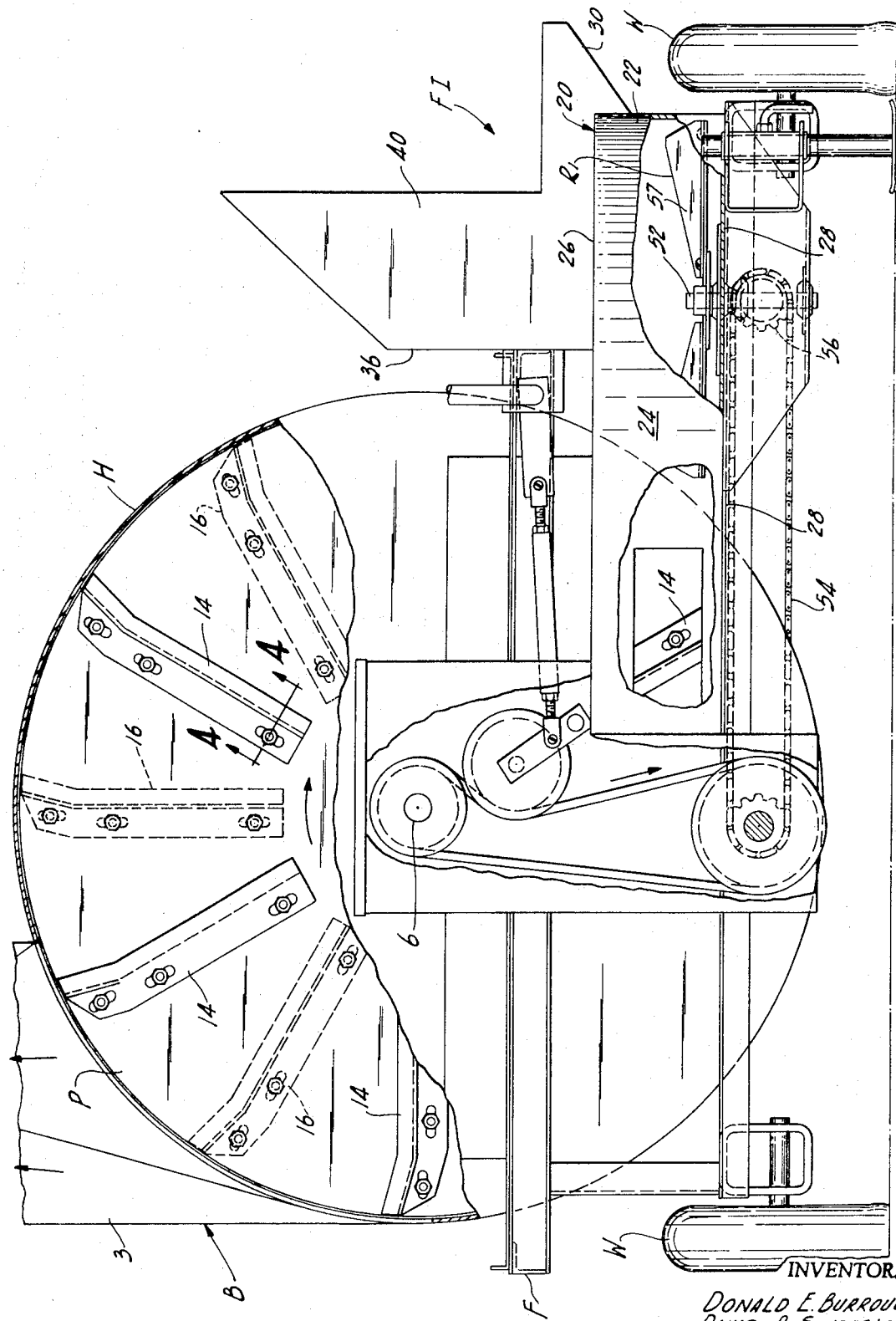

FEED MATERIAL HANDLING APPARATUS

BACKGROUND OF THE INVENTION

The invention relates to material handling apparatus of the type having a large vertical blower mounted on a horizontal axis which throws the material through a generally vertical pipe so as to fill a silo, for example.

Crop material is stored in a chopped condition in the silo, or the like, and a blower is used to deliver the crop to the top of the silo. The material is first fed to the blower by various means such as augers, horizontal rotors or other conveying mechanisms and is then picked up by the blower for discharge in a generally tangential direction from the blower. Various feeding inlets into the blower have been proposed in the past so as to smoothly feed the material into the blower and reduce the slugs of high peak loads imposed on the blower. It is important that the blower receives a sufficiently constant, even stream of material so that it can operate at maximum efficiency and assure an even stream of crop being delivered therefrom.

An example of prior art devices of this general type is found in the U. S. Pat. No. 3,594,047, issued July 20, 1971 to Pucher et al. That device utilizes a vertical blower having a single compartment and which compartment is fed from one side of the blower. The problems attendant to feeding devices of this general character, such as power requirements, uneven and noisy operation of the blower due to slugs of material directed to the blower, and other shortcomings of the prior art are discussed.

SUMMARY OF THE INVENTION

The present invention provides material handling apparatus having a vertical blower including a housing that is divided into two separate compartments by means of a single, central, rotatable member. Delivery paddles are provided on each side of the plate and thereby located in each of the compartments. The paddles or blades on the plate and which are located in one of the compartments are located in circumferentially-spaced relationship to the paddles in the other compartments, thereby assuring that the blower delivers an even stream of material and also assuring that the load imposed on the blower is more evenly distributed, resulting in a particularly efficiently operating blower. Thus the blower capacity is increased due to the increased number of impulses per revolution and the fact that the space between the paddles is kept filled, due to the opposing inlet.

The paddles on the center plate of the blower are inclined forwardly in respect to the direction of plate rotation so that their outer edge projects forwardly, thereby assuring movement of the material away from the blower sides and towards and against the central plate. This arrangement provides a centralized discharge of material into the vertical outlet of the blower where the material can then be discharged without being forced against the sides of the blower outlet.

The center plate thus provides a moving surface against which the material is urged, thereby eliminating side friction that occurs in blowers of conventional design.

Another aspect of the invention relates to means for evenly feeding the material into each of the compartments of the blower and this feeding means includes a separate, horizontally-disposed rotor for feeding each of the compartments. A common inlet hopper is provided for both of the rotors whereby the discharge of material from the wagon or other conveying vehicle or the like can be made into a single, common feed inlet, and into the circumferential, that is peripheral, portion of the blower.

The feeding arrangement of the material into the feeding rotors is such that it is in a direction opposite to that in which the rotors rotate, thereby insuring that the material is evened off or fed evenly to the blower rather than having slugs of material fed into the blower. In this manner, an even delivery of material to the throat of the blower, and on each side of the blower into the separate compartments, is assured.

These and other objects and advantages of the present invention will appear hereinafter as this disclosure progresses, reference being made to the accompanying drawings.

BRIEF DESCRIPTION OF THE DRAWINGS

FIG. 1 is a perspective view of a blower made in accordance with the present invention, certain parts being shown as broken away for clarity in the drawing;

FIG. 2 is a plan view of the blower, certain parts being shown as being broken away for clarity in the drawings;

FIG. 3 is a side elevational view of the blower, certain parts being shown as broken away; and FIG. 4 is a sectional view taken along line 4—4 in FIG. 3.

DESCRIPTION OF THE INVENTION

The apparatus provided by the present invention includes a vertically disposed blower B which is generally circular in shape and has a tangential discharge conduit 3 extending therefrom. The conduit 3 is also centrally located (FIG. 2) in a transverse direction relative to the blower sides. The blower includes the sheet metal housing H which is mounted in an angle iron frame F. The frame has ground-engaging wheels W and a forwardly extending draw bar 4 which can be attached to the rear of a tractor or the like. A power takeoff shaft 5 extends from the tractor and into the housing for driving a central member or plate P which is mounted on its shaft 6 within the housing. It would be noted that the plate P is centrally disposed as far as the width of the housing is concerned so as to divide the housing into two separate compartments 10 and 11. Paddles 14 are secured in compartment 10 and in circumferentially spaced relationship around the outer edge of the plate P and similar paddles 16 are similarly mounted on the opposite side of the plate and in compartment 11. It will be noted that the blades in one compartment are in circumferentially-spaced relationship in respect to the blades in the other compartment. This insures that the plate, as it rotates in its material-delivering function is evenly loaded, that is, the material is more evenly distributed around its circumference than is possible with a single compartment blower. Further, the paddles are inclined forwardly (FIG. 2) in respect to the direction in which the plate P rotates so that their outer edge projects forwardly, and with this construction, the material is moved away from the opposite sides of the blower and towards and against the central plate. This provides a centralized discharge of the material into the vertical outlet of the blower where the material can be moved against the sides of the blower outlet, as will appear. The central plate thus provides a moving surface against which the material is urged, thereby eliminating a side friction that would otherwise occur in blowers of conventional design.

Means are provided for separately feeding each of the compartments with an even flow of material so that the blower itself is fed evenly. This feeding means includes a pair of horizontally-disposed rotors R1 and R2 which are located in a feed inlet housing 20 that, in turn, is located at one edge of the housing of the blower which is opposite that to the discharge conduit of the blower. This feed housing includes a pair of generally circular vertical side wall members 22 and 23 having, respectively side wall members 24 and 25 that merge therewith and then extend generally tangentially therefrom so as to be inclined or angled relative to the opposite sides of the blower housing H. A suitable top plate 26 and bottom plate 28 are fastened by bolt means or the like (not shown) to the side walls, and a front vertically disposed wall 30 is also provided for the inlet feed housing.

The top 26 of the inlet feed housing has a generally rectangular opening 33 (FIG. 2) from which extends the common, singular and central feed inlet F1 which is generally rectangular in shape and is defined by a vertical rear wall 36, two opposite side walls 39 and 40 and the front feed wall 30 which is inclined downwardly towards the interior of the inlet housing.

Within each of the generally circular portions of the feed housing is located a horizontally-disposed rotor R1, R2 mounted on their respective vertical axes 52, 53 and driven through the pairs of bevel gears 51, 51a by a suitable flexible member such as roller chain 54 trained over a sprocket 56 located on a common shaft 55.

The rotors have paddles 57 fixed to their upper surfaces and at the outer ends of the rotors but within the periphery of the rotors. The rotors are driven in the direction of the curvilinear arrows and it will be noted that the sides of the rotors which are adjacent one another rotate in a direction away from the blower and together toward the front wall 30 of the feed inlet F1 of the housing.

The material is fed from the wagon 60 (FIG. 1) or the like and is shown as moving in the direction of the arrows and into the feed housing and deposited on the upper portion of the rotors. The majority of the material so deposited is actually moving in a direction opposite to the direction in which the adjacent sides of the rotors are rotating. In this manner, the rotors act to even off or strip the slugs of material which may be deposited thereon and break up the slugs and then evenly feed the material along the angled side walls and into the blower housing compartments. The material is then picked up by the paddles on either side of the central rotatable plate and due to the relationship of the staggered paddles in one compartment as compared to the other compartment, the material which has first of all been fed rather evenly into the housing H is then evenly picked up and fed by the blower in the housing and discharged through the conduit.

With the present feeding arrangement, a common inlet is provided for both of the horizontally disposed feeding rotors; the feeding rotors then act to break up or strip the slugs of material fed thereto and convey rather even streams of material to opposite sides of the blower housing. As the material then enters both of the compartments of the blower from opposite sides thereof, the blades of the central plate evenly pick up the material and evenly load the blower for maximum efficiency.

We claim:

1. A material handling apparatus having a vertically positioned blower housing of generally circular shape which has a generally tangential discharge conduit extending therefrom, said housing having opposite sides each of which having a feed inlet therein, and a rotatable central member located in said housing for rotation about a generally horizontal axis, said central member being located generally centrally between said opposite sides to thereby define with said housing two separate compartments, said member having paddles secured circumferentially therearound and on opposite sides thereof for conveying material in each of said compartments, said paddles in one compartment being circumferentially staggered with respect to the paddles located in the other compartment, thereby evenly loading said rotatable plate member.

2. The device as defined in claim 1 further characterized in that said housing has feed means for feeding material to each side thereof.

3. The device as defined in claim 2 further characterized in that said feed means includes a pair of generally horizontal rotors rotatable about generally vertical axes, one of said rotors being provided for each of the said compartments, said rotors being mounted in a feed inlet housing for conveying material to said blower housing compartments, and a central feed inlet for said rotors located generally therebetween.

4. The apparatus set forth in claim 3 further characterized in that said rotors are located adjacent one another and rotating in opposite directions, the adjacent sides of said rotors moving in a common direction away from said blower housing.

5. Material handling apparatus having a vertically positioned blower housing of generally circular shape which has a generally tangential discharge conduit extending therefrom, said housing having opposite flat sides each of which having a feed inlet therein, a plate member located in said housing and rotatable about a generally horizontal axis, said plate member being located centrally between said opposite flat sides to thereby define with said housing two separate compartments, said plate member having paddles secured circumferentially therearound and on opposite sides thereof for conveying material in each of said compartments, said paddles in one compartment being circumferentially spaced with respect to the paddles located in the other compartment; a pair of horizontal rotors rotatable about generally vertical axes, one of said rotors being provided for each of the said compartments, said rotors being mounted in a feed inlet housing, said feed inlet housing being in communication with said compartments and for conducting material thereto, and a central common feed inlet in said feed inlet housing for said rotors.

6. The apparatus set forth in claim 5 further characterized in that said rotors are located adjacent one another and rotating in opposite directions, the adjacent sides of said rotors moving in a common direction away from said blower housing.

7. A material handling apparatus having a vertically positioned blower housing of generally circular shape which has a generally tangential discharge conduit extending therefrom, said housing having opposite sides each of which having a feed inlet therein, and a rotatable plate member located in said housing for rotation about a generally horizontal axis, said plate member being located generally centrally between said opposite sides to thereby define with said housing two separate compartments, said plate member having paddles secured circumferentially therearound and on opposite sides thereof for conveying material in each of said compartments, said paddles in one compartment being circumferentially staggered with respect to the paddles located in the other compartment, thereby evenly loading said rotatable plate member, a feed inlet housing for conveying material to said blower housing compartments, and a pair of horizontal rotors in said inlet housing and rotatable about generally vertical axes, one of said rotors being provided for each of the said compartments.

8. The apparatus set forth in claim 7 further characterized in that said rotors are located adjacent one another and rotating in opposite directions, the adjacent sides of said rotors moving in a common direction away from said blower housing.

* * * * *